United States Patent [19]

Kertzman

[11] Patent Number: 4,705,543
[45] Date of Patent: Nov. 10, 1987

[54] FLUID DRYING TUBE

[75] Inventor: Jack Kertzman, Oceanport, N.J.

[73] Assignee: Perma Pure Products, Inc., Toms River, N.J.

[21] Appl. No.: 909,694

[22] Filed: Sep. 19, 1986

[51] Int. Cl.⁴ ............................................. B01D 53/22
[52] U.S. Cl. ........................................ 55/158; 55/208; 55/267; 55/387; 73/23; 210/490
[58] Field of Search .................. 55/16, 158, 159, 208, 55/267, 387, 389; 73/1 G, 23; 210/490

[56] References Cited

U.S. PATENT DOCUMENTS

| | | | |
|---|---|---|---|
| 3,245,206 | 4/1966 | Bonnet | 55/158 |
| 3,339,341 | 9/1967 | Maxwell et al. | 55/158 X |
| 3,442,002 | 5/1969 | Geary, Jr. et al. | 55/158 X |
| 3,547,272 | 12/1970 | Shaines et al. | 210/490 X |
| 3,563,889 | 2/1971 | Cooper, IV et al. | 210/490 X |
| 3,616,928 | 11/1971 | Rosenblatt | 55/158 X |
| 3,662,520 | 5/1972 | Saunders | 55/158 |
| 3,676,193 | 7/1972 | Cooper, IV et al. | 210/490 X |
| 3,735,558 | 5/1973 | Skarstrom et al. | 55/16 |
| 3,735,559 | 5/1973 | Salemme | 55/16 |
| 3,891,556 | 6/1975 | Richardson et al. | 210/490 |
| 4,061,574 | 12/1977 | Clark | 55/158 X |
| 4,066,553 | 1/1978 | Bardonnet et al. | 210/490 X |
| 4,207,192 | 6/1980 | Coplan et al. | 55/158 X |
| 4,308,654 | 1/1982 | Bogart | 55/16 X |
| 4,325,715 | 4/1982 | Bowman et al. | 55/158 |
| 4,352,736 | 10/1982 | Ukai et al. | 55/158 X |
| 4,469,495 | 9/1984 | Hiraizumi et al. | 55/158 X |
| 4,509,359 | 4/1985 | Gedron et al. | 73/23 |
| 4,539,113 | 9/1985 | Tomita et al. | 55/158 X |
| 4,631,128 | 12/1986 | Coplan et al. | 55/158 X |

Primary Examiner—Robert Spitzer
Attorney, Agent, or Firm—Robert M. Skolnik

[57] ABSTRACT

A fluid dryer includes a section of tubing covered by a braided netting. The tubing is formed of a material which has selective and reversible water-absorption properties. The braided netting may be composed of electrical resistance wire, metallic wire, plastic monofilament, etc. Several dryers using the braided tubing employ a dessicant bed and multiple sections of braided tubing.

13 Claims, 7 Drawing Figures

U.S. Patent  Nov. 10, 1987  Sheet 1 of 2  4,705,543
FIG. 1A  BRAIDED TUBING
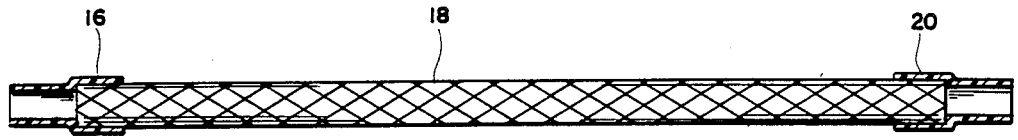
FIG. 1B  BRAIDED TUBING
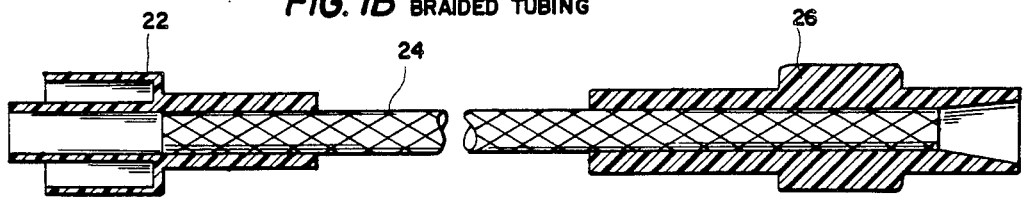
FIG. 3
WIRE BRAIDED TUBE-RESISTANCE WIRE
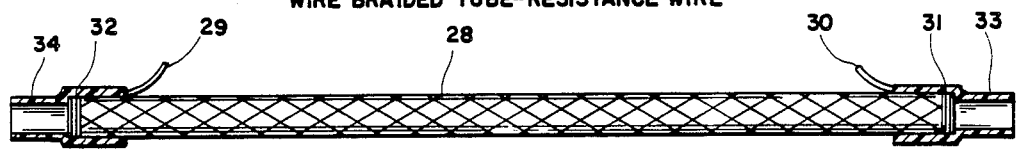
FIG. 4
METAL WIRE FOR COOLING & HEATING
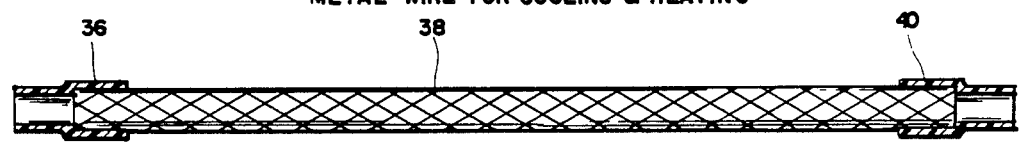
FIG. 2A
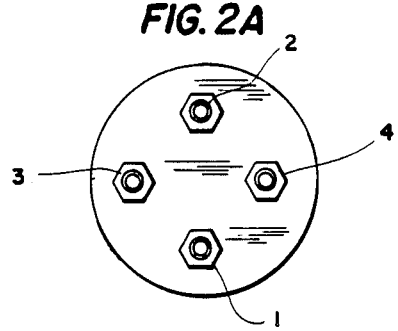

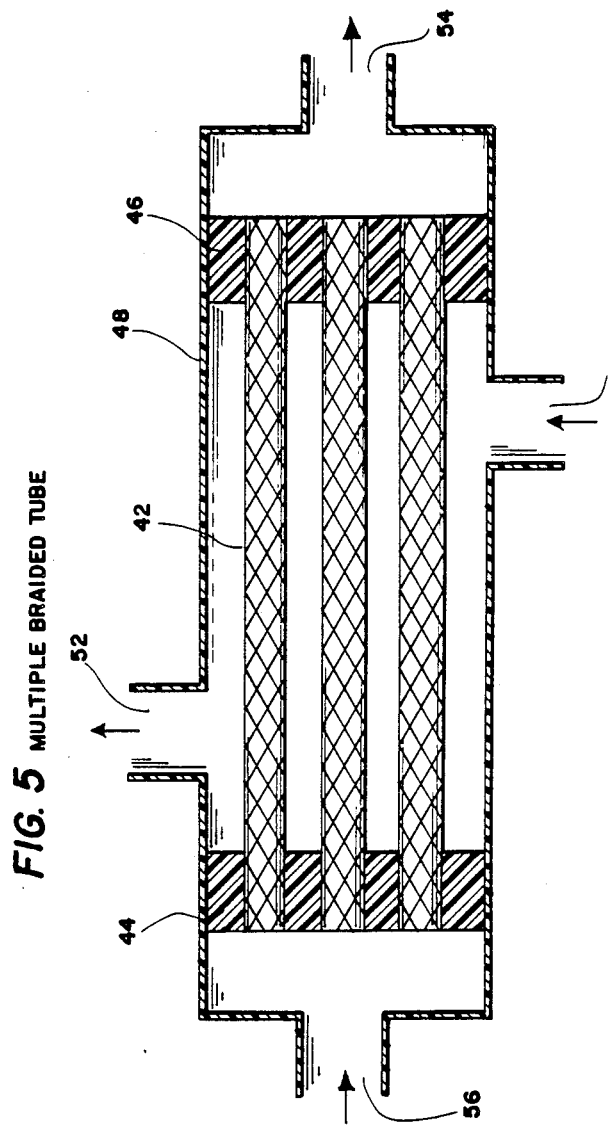
FIG. 5 MULTIPLE BRAIDED TUBE
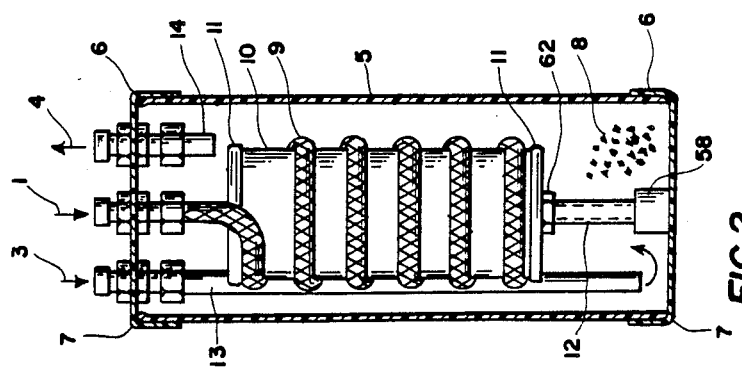
FIG. 2 DESICCANT DRYER WITH BRAIDED TUBING

FLUID DRYING TUBE

FIELD OF THE INVENTION

The present invention relates to flexible membrane drying and specifically to reinforced membrane tubes which operate without interference from and problems caused by water condensation in the tube. The construction of the tube is such that is materials are selected such that the humidity and temperature of the gases flowing through the tube are equalized to those of the ambient air surrounding the tube. Such tubes are made of materials which are mechanically protected by reinforcement such as the placement of the tube inside a plastic monofilament or metal wire braided netting.

The tube is formed of extrudable plastic materials which permit water vapor to diffuse through the walls of the tube but inhibit the ability of gases in the sample from so diffusing. The water vapor diffuses through the walls of the tube from the area of higher concentration to that of lower concentration level. In practice, when highly humid gas is sampled, the water vapor in the sample diffuses through the tube wall out into the relatively dry ambient air. Thus, condensation in the sampling tube is prevented from occuring and the problems occasioned by such condensation are eliminated.

The tubes find application in medicine in patient monitoring of expired breath, and in industry for process drying. The tubes are also employed for sampling emissions in pollution measurement and control and for process dehydration of fluids.

DESCRIPTION OF THE PRIOR ART

U.S. Pat. No. 4,509,359 to Gedeon et al. discloses a method and apparatus for measuring a gas inhaled or exhaled in patient monitoring. A gas sampling tube is employed which comprises a thin tube of a fluorosulfonyl polymer, the outer surface of which is in free contact with ambient air. The temperature and humidity of the breathing gas is brought into agreement with the temperature and humidity of the ambient air. The tube described in the patent is stated to include over part of its length, a section of a material having high selective and reversible water-absorption properties, and that this section has its outer surfaces in free contact with the ambient air.

U.S. Pat. No. 3,735,558 commonly assigned and co-invented by the inventor of the present invention, discloses the use of perfluro sulfonic acid polymeric hollow tubes for separating and drying of fluids and gases.

The drying and diffusion capabilities of certain materials have long been known in the art. The present invention uses such materials but encloses the permeable tube in a braiding of tightly wrapped material such as natural or plastic monofilament, or metal wire over the diffusion tubing. The tubing is, preferably, formed of a sulfonate as taught in the aforementioned U.S. Pat. No. 3,735,558. Other extrudable ion exchange tubing such as the cation and anion polymers of polyethylene and other low molecular weight hydrocarbons may be used, as well. The braiding offers several advantages as follows: mechanical protection of the thin wall tubular membrane by preventing it from being touched by any outside material or by the person; mechanical strength permitting the tubing to be handled in a normal manner for ordinary tubing without the need for special concerns or special handling to prevent the tubing from stretching; and the tubing can be bent without developing kinks, pinches or compression resistance. The foregoing can be accomplished using tubing having even thinner walls than that used unbraided. The thinner walls produce increased transport rates of water through the membrane.

In certain of the applications of such tubing discussed herein, the mechanical integrity of the tubing is improved when the section of braided tubing is packed in a bed of other materials. The use of metal as the braiding material offers improved heat and cold transfer for the tubing walls and improved temperature control capability.

If the tubing sections are used adjacent to each other as by direct physical contact, the braiding serves as a spacer to prevent the surfaces of the membranes from overlaying each other thereby decreasing the exposed surface area and increasing inefficiency as a result. Further, the braiding improves the mixing of the gas exterior to the tubing (known as the "sweep gas") and its distribution on the outer tubing surface.

The foregoing is accomplished without any reduction in the ability of the tubing to remove moisture from a sample.

Several embodiments of apparatus employing the improved braided tubing of my invention are described in this application. One of these embodiments employs the braided tubing embedded in a dessicant bed. This dessicant bed enhances the ability of the tube to remove moisture from a sample by increasing the difference in relative humidity between the sample and the ambient environment external to the tube. The braiding also protects the tubing from mechanical or chemical interference from the dessicant. This apparatus is used to perform field tests of emissions in pollution control applications.

Another embodiment is used in process drying where the tube can now be employed in pressures which are ten to twenty times greater than those in which the unbraided tubing can be safely employed.

A further embodiment wraps resistance wire around the braiding so that the tube can be heated electrically. In another embodiment, the tubing may be covered with metal wire for conduction heating and cooling. These later embodiments all recognize that the rate of transfer by diffusion through the tubing doubles for each 10° C. in temperature differential which can be induced.

The principal object of the invention is the provision of a reinforced tubular membrane device that can transport moisture from a gas sample to the environment surrounding the tube by using braiding over the permeable material.

Another object of the invention is the provision of a gas sampling moisture selective tube which is mechanically stronger than tubing formed of the diffusion material, alone. Another object of the invention is the employment of braided permeable tubing in a dessicant bed to produce portable sampling devices for pollution measurement or control applications. A further object of the invention is the provision of reinforced membrane tubing which can be used at much higher pressures than to which the tubing was previously capable of being subjected.

These as well as further objects and advantages of the invention will become apparent to those skilled in the art from a review of the following detailed specification reference being made to the accompanying drawings in which:

FIG. 1A is a side view of the braided tube of the invention;

FIG. 1B is a side view of the tubing of FIG. 1 with LEUR ® fittings for medical applications;

FIG. 2 is a sectional view of a device employing tubing is a dessicant bedding:

FIG. 2A is a top view of the device of FIG. 2;

FIG. 3 is a side view of the braided tubing wrapped with electrical resistance heating wire;

FIG. 4 is a side view of the braided tubing using coated copper wire for cooling; and FIG. 5 is a section view of a device employing multiple tubes and sweep gas.

FIG. 1A is a side view of the braided tubing of my invention. The braided tubing is shown at numeral 18. Two connectors, 16 and 20 are coupled to the ends of the tubing for connection to other tubing or to other apparatus. The tubing of FIG. 1A is the extruded plastic materials discussed in my U.S. Pat. No. 3,735,558 or it may be the extrudable ion exchange tubing discussed herein.

FIG. 1B is a side view of another embodiment of my invention. In FIG. 1B, the braided section of tubing 24 has male and female LUER ® fittings connected thereto. The male fitting is denoted by numeral 22 while the female fitting is denoted by numeral 26. These LEUR ® fittings are well known in the medical arts and the embodiment of FIG. 1B is specifically suited to patient monitoring as disclosed in the aforementioned Gedeon et al U.S. Pat. No. 4,509,359.

The connectors in FIG. 1A and FIG. 1B may be affixed onto the tubing by suitable adhesive, or by frictional fit, or by a combination of both adhesive and frictional engagement.

FIG. 2 is a side view, partially in section, of a dessicant type dryer using the braided tubing of the present invention. In FIG. 2 and in FIG. 2A, a top view of the apparatus of FIG. 2, numeral 1 denotes the sample gas inlet, and numeral 2 is the sample gas outlet. Purge or sweep gas is connected to purge gas inlet 3 and the purge gas is removed at purge gas outlet 4. The entire apparatus is housed in shell housing 5.

The housing 5 has end closure caps 6 formed to cover the ends of the cylindrical shell housing 5. If required, seals 7 may be employed to ensure a good closure between the end caps 6 and housing 5. The spaces shown within the housing 5 of FIG. 2 are filled with a dessicant 8. The drying tube of the present invention is shown at numeral 9 and is wrapped around a supporting cylindrical surface 10. The support 10 is formed of a screen material. The screen support 10 has upper and lower end caps 11 connected thereto for structural support of the screen material. The entire support 10 may be connected to end cap 6 via threaded rod 12. The rod 12 connects the end cap 6 to end cap 11. Suitable female threaded holes are formed in caps 6 and 11. These threaded holes are shown at numerals 58 and 60, respectively.

A tube, 13 is connected to inlet 3. Another tube, 14 is connected to outlet 4. Tube 13 is the purge or sweep gas inlet tube while tube 14 is the purge gas outlet tube. As will now be clearly seen, the device of FIG. 2 operates by allowing a purge gas to enter and exit surrounding the braided tubing of the invention. A dessicant also surrounds the tubing. The gas sample is permitted to circulate within the braided tubing and to exit therefrom. Water is removed by the combined effects of the dessicant and of the purge gas. The braided tubing for the sample is connected to both inlet 1 and outlet 2 in FIGS. 2 and 2A FIG. 3 is a side view of another embodiment of the invention. Here, the section of braided tubing is shown at 28. In this embodiment however, the membrane tube is braided with electrical resistance wire. Connectors 33 and 34 are coupled to the braided tubing. Sleeves 31 and 32 are employed to insulate the wire from the connectors. The lead wire from the termination sleeves 31 and 32 is shown by numerals 29 and 30. This embodiment can be used to precisely control the temperature of the surface of the membrane tubing.

FIG. 4 shows another embodiment where the membrane tubing is braided with metal wire 38. Connectors 36 and 40 are again employed. The metal wire can be used for heating or cooling via conduction through the metal braiding.

FIG. 5 is a sectional view of a dryer employing multiple sections of braided tubing. Housing 48 has a sample inlet 56 formed at one end thereof. A sample outlet 54 is formed at the opposite end. A purge gas inlet 50 and a purge gas outlet 52 are formed in the housing 48. Sealed spacers 44 and 46 inhibit the ability of the purge gas and the sample gas from mixing. Spacers 44 and 46 also support the ends of a number of sections of braided tubing (three being shown in FIG. 5). Any number of sections of tubing 42 may be employed in this configuration. As will now be seen, sample gas is introduced at inlet 56 and migrates through the sections of tubing 42 to outlet 54. Purge gas 50 circulates around tubes 42 via purge gas inlet 50 and is withdrawn via purge gas outlet 52. Sealed spacers 44 and 46 serve to isolate the purge gas from the sample gas or fluid.

The effectiveness of the braided tubing of my invention has been demonstrated. The following examples are illustrative:

| MEDICAL DRYERS | | | | |
|---|---|---|---|---|
| Model | Length (in.) | I.D. (in.) | O.D. (in.) | Internal Volume (cc) |
| ME-050-6 | 6 | .040 | .052 | .124 |
| ME-050-12 | 12 | .040 | .052 | .248 |
| ME-050-24 | 24 | .040 | .052 | .496 |
| ME-070-6 | 6 | .060 | .072 | .278 |
| ME-070-12 | 12 | .060 | .072 | .556 |
| ME-070-24 | 24 | .060 | .072 | 1.112 |
| ME-110-6 | 6 | .085 | .106 | .558 |
| ME-110-12 | 12 | .085 | .106 | 1.116 |
| ME-110-24 | 24 | .085 | .106 | 2.232 |

| | 1 | 2 | 3 | 4 | 5 | 6 | 7 | 8 | 9 | 10 | 11 |
|---|---|---|---|---|---|---|---|---|---|---|---|
| Model | Flow cc/min. | Inlet D.Pt. °C. | HC Temp. °C. | HC D.Pt. | Dryer D.Pt. | HC D.Pt. | Dryer D.Pt. | HC D.Pt. | Dryer D.Pt. | v/v/ min. | R.T. (sec.) |

MEDICAL DRYERS -continued

| | | | | | | | | | | |
|---|---|---|---|---|---|---|---|---|---|---|
| ME-050-6 | 50 | 18 | 23 | 4 | 5 | 10 | 11 | 15 | 15 | 403 | 0.15 |
| ME-050-6 | 100 | 18 | 23 | 5 | 8 | 10 | 12 | 15 | 15 | 806 | 0.075 |
| ME-050-6 | 200 | 19 | 24 | 6 | 12 | 11 | 15 | 15 | 17 | 1612 | 0.038 |
| ME-050-12 | 50 | 19 | 24 | 5 | 9 | 10 | 10 | 15 | 15 | 202 | 0.3 |
| ME-050-12 | 100 | 19 | 24 | 5 | 6 | 11 | 11 | 15 | 15 | 404 | 0.15 |
| ME-050-12 | 200 | 19 | 24 | 7 | 10 | 12 | 13 | 15 | 16 | 808 | 0.075 |
| ME-050-24 | 50 | 19 | 25 | 6 | 8 | 10 | 10 | 15 | 15 | 101 | 0.6 |
| ME-050-24 | 100 | 19 | 25 | 6 | 6 | 11 | 11 | 15 | 15 | 202 | 0.3 |
| ME-050-24 | 200 | 19 | 25 | 8 | 8 | 12 | 12 | 15 | 15 | 404 | 0.15 |
| ME-070-6 | 50 | 18 | 23 | 8 | 8 | 10 | 10 | 14 | 14 | 180 | 0.33 |
| ME-070-6 | 100 | 18 | 23 | 8 | 9 | 10 | 10 | 14 | 14 | 360 | 0.17 |
| ME-070-6 | 200 | 18 | 23 | 8 | 11 | 10 | 13 | 15 | 17 | 720 | 0.08 |
| ME-070-12 | 50 | 20 | 24 | 5 | 6 | 11 | 11 | 16 | 16 | 90 | 0.67 |
| ME-070-12 | 100 | 20 | 23 | 5 | 5 | 11 | 11 | 16 | 16 | 180 | 0.34 |
| ME-070-12 | 200 | 20 | 23 | 5 | 5 | 13 | 13 | 16 | 17 | 360 | 0.17 |
| ME-070-24 | 50 | 20 | 25 | 7 | 7 | 11 | 11 | 16 | 16 | 45 | 1.33 |
| ME-070-24 | 100 | 20 | 25 | 7 | 7 | 11 | 11 | 17 | 17 | 90 | 0.67 |
| ME-070-24 | 200 | 20 | 25 | 7 | 7 | 13 | 13 | 19 | 19 | 180 | 0.34 |
| ME-110-6 | 50 | 19 | 24 | 4 | 4 | 11 | 11 | 17 | 17 | 90 | 0.67 |
| ME-110-6 | 100 | 19 | 24 | 5 | 5 | 12 | 12 | 17 | 17 | 180 | 0.34 |
| ME-110-6 | 200 | 19 | 24 | 5 | 6 | 12 | 13 | 17 | 19 | 360 | 0.17 |
| ME-110-12 | 50 | 19 | 25 | 8 | 8 | 12 | 12 | 16 | 16 | 45 | 1.33 |
| ME-110-12 | 100 | 19 | 25 | 8 | 8 | 12 | 12 | 16 | 16 | 90 | 0.67 |
| ME-110-12 | 200 | 19 | 25 | 8 | 9 | 13 | 13 | 16 | 16 | 180 | 0.34 |
| ME-110-24 | 50 | 19 | 25 | 8 | 8 | 12 | 12 | 16 | 16 | 23 | 2.66 |
| ME-110-24 | 100 | 20 | 25 | 8 | 8 | 12 | 12 | 16 | 16 | 45 | 1.33 |
| ME-110-24 | 200 | 21 | 25 | 9 | 9 | 13 | 13 | 16 | 16 | 90 | 0.67 |

Column 1 - Flow of sample gas in cc/min.
Column 2 - Dewpoint of wet air from humidity generator in Deg. C.
Column 3 - Air Temperature of humidity chamber in Deg. C.
Column 4, 6, 8 - Dewpoint of air in humidity chamber in Deg. C.
Column 5, 7, 9 - Dewpoint of air at outlet of dryer in humidity chamber in Deg. C.
Column 10 - v/v/min. is the volumetric flow through the dryer equal to the gas flow in cc/min divided by the internal volume of the dryer in cc.
Column 11 - R.T. is the residence time of the gas through the dryer expressed in seconds and is equal to 60 sec/min. divided by v/v/min.

The test results set forth in the table above were obtained with samples of braided tubing where the tubing was formed of the material discussed in the aformentioned U.S. Pat. No. 3,735,558 covered with a braiding of plastic monofilament. The apparatus employed to test the samples consisted of a source of dry air feeding into a humidity generator. The humidified air thus produced was fed to the sample under test which was mounted in a chamber with controlled relative humidity. Measurements of flow rate and dew point were obtained for the humidified air inputted, the dry air inputted, the output of the sample and the humidity in the chamber.

As modifications to the foregoing may be made without departing from the spirit and scope of my invention, what is sought to be protected by United States Letters patent is set forth in the appended claims.

I claim:

1. A fluid drying device comprising a section of tubing formed of a first material having selective and reversible water-absorption properties, the surface of said tubing covered with a braided netting of a second material, and means for connecting said tubing to receive fluid.

2. The device of claim 1 wherein said second material is electrical resistance wire.

3. The device of claim 1 wherein said second material is metallic wire.

4. The device of claim 1 wherein said second material is plastic monofilament.

5. A fluid drying device comprising: a housing; a hollow cylindrical support mounted in said housing; a section of water permeable membrane tubing supported about said cylindrical support, said tubing having an inlet end and an outlet end; a braided netting tightly covering the entire length of said tubing; a dessicant surrounding said tubing in said housing; and means to supply fluid to said inlet and withdraw fluid from said outlet.

6. The device of claim 5 further including a second inlet and a second outlet, said second inlet and said second outlet being in fluid communication with said dessicant, and means connected to said second inlet and to said second outlet to supply and withdraw purge gas, respectively, from said device.

7. The device of claim 6 further including first and second end caps affixed to said housing; support means for said cylindrical support affixed to said cylindrical support and one of said end caps; and said first and second inlets and said first and second outlets being in fluid communication with said second end cap.

8. The device of claim 5 wherein said membrane tubing is in contact with said cylindrical support; said cylindrical support being formed of an open screen material.

9. The device of claim 8 further including end cap means connected to said cylindrical support for assuring that said cylinder retains its shape.

10. A fluid dryer having an inlet end and an outlet end, means for supplying a fluid to be dried to said inlet end, a plurality of sections of tightly braided gas absorption membrane tubing mounted for fluid communication with said inlet end and said outlet end, said sections of tubing being hollow for receiving a portion of said fluid to be dried; sealing and mounting means for said tubing mounted in said dryer, said sealing and mounting means supporting said sections of tubing is spaced relationship to each other and to said inlet end and said outlet end.

11. The dryer of claim 10 wherein said membrane tubing has a purge gas circulated around the outer surfaces of said tubing, said purge gas circulation being effected by a second inlet means formed in said dryer between said sealing and mounting means for receiving said purge gas, and a second outlet means formed between said mounting means for withdrawing said purge gas.

12. A fluid drying device comprising a section of tubing formed of a first material having selective and reversible water-absorption properties, means covering the surface of said tubing for protecting the tubing from the effects of handling, enhance the heat transfer properties of said tubing, increase the mechanical strength of said tubing and increase the pressures to which said tubing can be subjected; and means for connecting said tubing to receive fluid.

13. The device of claim 12 wherein said means is a braided netting of a second material.

* * * * *